(12) United States Patent
Jartoft

(10) Patent No.: US 12,311,843 B2
(45) Date of Patent: May 27, 2025

(54) MOUNTING BRACKET FOR AN INTERIOR MIRROR ASSEMBLY OF A VEHICLE, INTERIOR MIRROR MODULE AND INTERIOR MODULE

(71) Applicant: Volvo Car Corporation, Gothenburg (SE)

(72) Inventor: Hans Jartoft, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/121,195

(22) Filed: Mar. 14, 2023

(65) Prior Publication Data

US 2023/0294604 A1    Sep. 21, 2023

(30) Foreign Application Priority Data

Mar. 15, 2022 (EP) ..................................... 22162345

(51) Int. Cl.
*B60R 1/04* (2006.01)
(52) U.S. Cl.
CPC ..................................... *B60R 1/04* (2013.01)
(58) Field of Classification Search
CPC ............. B60R 1/04; B60R 1/12; F16M 11/10
USPC .... 248/487, 477, 479, 481, 484, 476, 475.1, 248/324
See application file for complete search history.

(56) References Cited

U.S. PATENT DOCUMENTS

| 1,478,826 A | 12/1923 | Hawthorne et al. |
| 1,589,378 A | 6/1926 | Erkins et al. |
| 1,795,871 A * | 3/1931 | Lehmann ................... B60R 1/06 D12/189 |
| 1,823,636 A * | 9/1931 | Winkler ..................... B60R 1/06 248/122.1 |
| 1,883,287 A * | 10/1932 | Zink ........................ B60R 1/06 248/213.1 |

(Continued)

FOREIGN PATENT DOCUMENTS

| KR | 200334288 Y1 | 11/2003 |
| KR | 20050114492 A | 12/2005 |
| KR | 100847975 B1 | 7/2008 |

OTHER PUBLICATIONS

Aug. 31, 2022 European Search Report issued in corresponding EP Application No. 22162345.

*Primary Examiner* — Ingrid M Weinhold
(74) *Attorney, Agent, or Firm* — Clements Bernard Walker; Christopher L. Bernard

(57) ABSTRACT

A mounting bracket for an interior mirror assembly of a vehicle. The mounting bracket includes a bar-shaped support element having a first end and a second end. A mounting interface for connecting the interior mirror assembly to the mounting bracket is connected to the support element. Moreover, a first lever arm extends from the support element and has a first pivot feature. A second lever arm extends from the support element and has a second pivot feature. The support element, the first lever arm and the second lever arm form a U-shape. Additionally, an interior mirror module includes an interior mirror assembly and such a mounting bracket. Furthermore, an interior module for a vehicle includes a console unit being configured for being connected to a windshield or to a roof structure of the vehicle. The interior module also includes a mounting bracket pivotably supported on the console unit.

10 Claims, 2 Drawing Sheets

(56) References Cited

U.S. PATENT DOCUMENTS

| | | | | |
|---|---|---|---|---|
| 2,134,016 | A * | 10/1938 | Zink | B60R 1/06 |
| | | | | 248/122.1 |
| 2,504,387 | A | 4/1950 | Pruellage | |
| 3,000,264 | A * | 9/1961 | Felts | B60R 1/04 |
| | | | | 248/478 |
| 3,425,657 | A * | 2/1969 | Doyle | B60R 1/04 |
| | | | | 248/549 |
| 4,899,975 | A * | 2/1990 | Suman | B60R 11/00 |
| | | | | 403/90 |
| 4,934,802 | A * | 6/1990 | Fluharty | G02B 7/1824 |
| | | | | 359/872 |
| 5,210,652 | A * | 5/1993 | Perkinson | B60R 1/04 |
| | | | | 359/877 |
| 5,966,255 | A * | 10/1999 | Mochizuki | B60R 1/04 |
| | | | | 248/478 |
| 8,451,332 | B2 * | 5/2013 | Rawlings | B60R 1/04 |
| | | | | 348/148 |
| 9,315,154 | B1 * | 4/2016 | Gibbs | B60R 1/04 |
| 2012/0026616 | A1 * | 2/2012 | Rawlings | B60R 1/04 |
| | | | | 359/872 |
| 2023/0286441 | A1 * | 9/2023 | Schnellbach | B60Q 3/258 |

* cited by examiner

MOUNTING BRACKET FOR AN INTERIOR MIRROR ASSEMBLY OF A VEHICLE, INTERIOR MIRROR MODULE AND INTERIOR MODULE

CROSS-REFERENCE TO RELATED APPLICATION

The present disclosure claims the benefit of priority of co-pending European Patent Application No. 22 162 345.7, filed on Mar. 15, 2022, and entitled "MOUNTING BRACKET FOR AN INTERIOR MIRROR ASSEMBLY OF A VEHICLE, INTERIOR MIRROR MODULE AND INTERIOR MODULE," the contents of which are incorporated in full by reference herein.

TECHNICAL FIELD

The present disclosure relates to a mounting bracket for an interior mirror assembly of a vehicle. Additionally, the present disclosure is directed to an interior mirror module including an interior mirror assembly and such a mounting bracket. Moreover, the present disclosure relates to an interior module for a vehicle including such a mounting bracket.

BACKGROUND

Interior mirrors of vehicles usually are mounted on an upper portion of a windshield or on a front portion of a roof structure of the vehicle. In modern vehicles, interior modules may be provided in the same region of the vehicle's interior. Such interior modules for example host sensor units and/or storage compartments. Additionally, interior mirror modules are usually provided with a mechanism that allows the interior mirror assembly to fold away when being impacted, e.g. by a driver or passenger reaching for objects within the vehicle.

Thus, when designing an interior of a vehicle, a very limited amount of space is available for both the interior module and the fold-away mechanism of the interior mirror module. In other words, the fold-away mechanism and the interior module require conflicting spaces.

SUMMARY

It is, therefore, an objective of the present disclosure to solve or at least alleviate this conflict and provide a solution which offers sufficient space for both the interior module and the fold-away mechanism of the interior mirror module.

According to a first aspect, there is provided a mounting bracket for an interior mirror assembly of a vehicle. The mounting bracket includes a bar-shaped support element having a first end and a second end. Moreover, the mounting bracket includes a mounting interface for connecting the interior mirror assembly to the mounting bracket. The mounting interface is connected to the support element at a position between the first end and the second end. Furthermore, the mounting bracket includes a first lever arm which extends from the first end of the support element and has a first pivot feature at its free end. Additionally, the mounting bracket includes a second lever arm which extends from the second end of the support element and has a second pivot feature at its free end. The support element, the first lever arm and the second lever arm form a U-shape. The second end of the support element is opposed to the first end of the support element. Thus, the mounting bracket offers a free space in the interior of the U-shape when being installed in an interior of the vehicle. This free space can be used for other components of the interior of the vehicle such as interior modules of the type mentioned above. The first and second pivot features may be used to form a fold-away mechanism for the mounting bracket and an interior mirror assembly being mounted thereon. Thus, the conflict mentioned above is solved since the U-shape offers sufficient space for additional interior components and provides a fold-away mechanism.

It is noted that a length of the first and second lever arms can be adapted to a specific implementation. Also the length of the bar-shaped support element may be adapted. Thus, the size of the interior of the U-shape may be chosen in accordance to a specific implementation of the mounting bracket, thereby offering an adaptable free space for additional interior components.

In an example, the first lever arm and the second lever arm extend in parallel from the support element. Consequently, the mounting bracket is structurally simple. At the same time it is mechanically stable and compact.

In another example, the first lever arm and the second lever arm have substantially the same length and/or are generally shaped identically. In such a configuration, the structure of the mounting bracket is especially simple. Consequently, the mounting bracket may be produced at comparatively low costs.

In an example, at least one of the first pivot feature and the second pivot feature includes at least one of a hole for receiving a pivot axle and a stub axle for cooperating with a pivot hole. Thus, the first pivot feature and the second pivot feature may be identical or different. If they are identical, both pivot features may include a hole for receiving a pivot axle or both pivot features may include a stub axle. Consequently, the mounting bracket may be pivotably supported within an interior of the vehicle. Such a support may form part of a fold-away mechanism which is, thus, structurally simple and reliable in operation.

In an example, the mounting interface is connected to the support element via an extension element. This means that the mounting interface is not arranged directly on the support element. The extension element, thus, forms an intermediate element connecting the mounting interface and the support element. The extension element is for example realized as a stub. Consequently, there is provided sufficient space for an interior mirror assembly being connected to the mounting interface to be adjusted in its position and/or orientation.

In an example, the mounting interface may include a joint ball. Consequently, an interior mirror assembly being connected to the mounting assembly may be easily adjusted in its position and/or orientation.

In an example, the support element, the first lever arm, the second lever arm and the mounting interface are portions of a unitary piece. If an extension element is provided, also the extension element may form part of the unitary piece. In other words, the support element, the first lever arm, the second lever arm and the mounting interface are formed as an integral part. If an extension element is provided, also the extension element may form part of the integral part. Thus, when producing the mounting bracket, no assembly processes are necessary. Moreover, the mounting bracket may be produced in a partly or fully automated manner. Thus, the mounting bracket may be produced at comparatively low costs.

In an example, the mounting bracket is formed as an injection molded part. Thus, the mounting bracket may be produced with high efficiency. This is especially the case when producing large quantities of mounting brackets.

In an example, the free end of at least one of the first lever arm and the second lever arm may be elastically deformable in a direction parallel to the extension of the support element. This means that a distance between the free ends of the first lever arm and the second lever arm may be increased by elastically bending the first lever arm and/or the second lever arm. In such a configuration, the elasticity may be used for engaging the first pivot feature and/or the second pivot feature with a corresponding counter pivot feature. Once the first pivot feature and/or the second pivot feature is engaged with the corresponding counter pivot feature, the first lever arm and/or the second lever arm may come back to its original position. Thus, the mounting bracket may be easily mounted in an interior of a vehicle.

According to a second aspect, there is provided an interior mirror module. The interior mirror module includes an interior mirror assembly and a mounting bracket according to the present disclosure. The interior mirror assembly is connected to the mounting bracket via the mounting interface. In this context, an interior mirror assembly includes a mirror element, i.e. a plate-shaped element being reflective on one side, and a mirror housing, i.e. a shell-shaped element in which the mirror element is arranged. Due to the mounting bracket, as has already been explained above, a fold-away mechanism may be provided for such an interior mirror assembly. At the same time, the mounting bracket leaves sufficient space for other interior components of the vehicle due to the U-shape.

According to a third aspect, there is provided an interior module for a vehicle. The interior module includes a console unit. The console unit has a connection interface being configured for connecting the console unit to a windshield or to a roof structure of the vehicle. Moreover, the interior module includes a mounting bracket according to the present disclosure. The mounting bracket is pivotably supported on the console unit via the pivot features of the first lever arm and the second lever arm and corresponding pivot features of the console unit. Thus, when using such an interior module, both a console unit and a support for an interior mirror module having a fold-away mechanism can be provided. Thus, the space in an interior of the vehicle is efficiently used. In this context, the pivot connection between the mounting bracket and the console unit forms part of the fold-away mechanism. Of course, it is also possible that an interior mirror assembly is mounted to the mounting interface of the mounting bracket. In such a case, the interior module includes an interior mirror module according to the present disclosure.

In an example, each of the pivot features of the console unit includes at least one of a pivot hole and a stub axle. The pivot features of the console unit can be configured in the same manner or differently. It is understood that in a case in which a pivot feature of the console unit includes a pivot hole, the corresponding pivot feature of the mounting bracket includes a stub axle and vice versa. Thus, the mounting bracket may pivot reliably on the console unit.

In an example, the pivot features of the console unit are arranged on opposing side surfaces of the console unit. These side surfaces may be oriented to the left and to the right with respect to a forward driving direction of a vehicle in which the console unit is used. In such a case, the mounting bracket may pivot to the front and/or to the back with respect to the forward driving direction. Consequently, an effective fold-away mechanism for the interior mirror assembly may be formed.

In an example, at least a portion of the console unit is received in an interior of the U-shape formed by the support element, the first lever arm and the second lever arm of the mounting bracket. In other words, the mounting bracket may be placed over the console unit. This is a space-saving manner to arrange the mounting bracket while maintaining all relevant functions, especially a fold-away function. At the same time, there is enough space for the console unit.

In an example, at least one abutment element is provided on the console unit. The abutment element includes an abutment surface against which the mounting bracket abuts when being in an operational position. The operational position of the mounting bracket corresponds to a standard position of the interior mirror assembly which may be mounted thereon. In the standard positon the interior mirror assembly is not folded away, but arranged within the interior such that a driver of the corresponding vehicle can observe rear traffic using the interior mirror assembly. The abutment surface may be oriented towards a front side with respect to a forward driving direction. Consequently, the abutment surface reliably defines the position of the mounting bracket, when in the operational positon. At the same time, the abutment element does not hinder a folding-away movement.

In an example, the abutment element is formed as a portion of the console unit. In other words, the abutment element is an integral part of the console unit.

In an example, two or more abutment elements may be provided on the console unit. These abutment elements may be distributed over the console unit. In a case, in which two abutment elements are provided, they may be arranged on opposite sides of the console unit. Thus, the mounting bracket is reliably positioned in the operational position.

In an example, at least one holding protrusion is provided on the console unit. The at least one holding protrusion may be arranged at a distance from the abutment element such that a holding portion of the mounting bracket may be received between the abutment element and the holding protrusion when the mounting bracket is in the operational position. The operational position has already been defined above. Thus, in this position the mounting bracket is held between the holding protrusion and the abutment element. A space between the holding protrusion and the abutment element may substantially correspond to a width of the holding portion of the mounting bracket which is arranged between the holding protrusion and the abutment element. Thus, the mounting bracket is reliably held in the operational position.

In an example, two or more holding protrusions may be provided on the console unit. These holding protrusions may be distributed over the console unit. In a case, in which two holding protrusions are provided, they may be arranged on opposite sides of the console unit. Thus, the mounting bracket is reliably held in the operational position.

In an example, the holding portion of the mounting bracket may be a portion of the support element.

In an example, the holding protrusion is formed as a portion of the console unit. In other words, the holding protrusion is an integral part of the console unit.

In an example, at least one of the holding protrusion and a portion of the mounting bracket is deformable such that the mounting bracket may be transferred into a retracted position, in which the holding portion of the mounting bracket is spaced away from the abutment element and onto the holding protrusion. The retracted position corresponds to a position in which an interior mirror assembly being connected to the mounting bracket is folded away. It is noted that a certain force is needed to deform the holding protrusion and/or the mounting bracket in order to liberate the transfer of the mounting bracket to the retracted position. The force may be adjusted by adjusting the deformability of the holding protrusion and/or the mounting bracket. Alternatively or additionally, the force may be adjusted by the form of the holding protrusion and/or the mounting bracket. Moreover, the force may be adjusted by the height of the holding protrusion. Consequently, a fold-away mechanism is provided, wherein a force being necessary for folding away the interior mirror assembly can be precisely defined. Thus, the fold-away mechanism is reliable in operation.

In an example, at least one of the holding protrusion and a portion of the mounting bracket is elastically deformable. Thus, the mounting bracket may be simply moved back from the retracted position to the operational positon. Consequently, the fold-away mechanism may be used several times.

In an example, at least one of a radar unit, a lidar unit, a camera unit, a light sensor unit, a humidity sensor unit, and a rain sensor unit is arranged inside the console unit. In such a case, the console unit may also be designated as a sensor unit. It is understood that in general all kinds of sensor units may be arranged inside the console unit. Alternatively or additionally, one or more storage compartments may be located in the console unit, e.g. for sunglasses.

It should be noted that the above examples may be combined with each other irrespective of the aspect involved.

These and other aspects of the present disclosure will become apparent from and elucidated with reference to the examples described hereinafter.

BRIEF DESCRIPTION OF THE DRAWINGS

Examples of the disclosure will be described in the following with reference to the following drawings.

The figures are merely schematic representations and serve only to illustrate examples of the disclosure. Identical or equivalent elements are in principle provided with the same reference signs.

DETAILED DESCRIPTION

Figure 1:
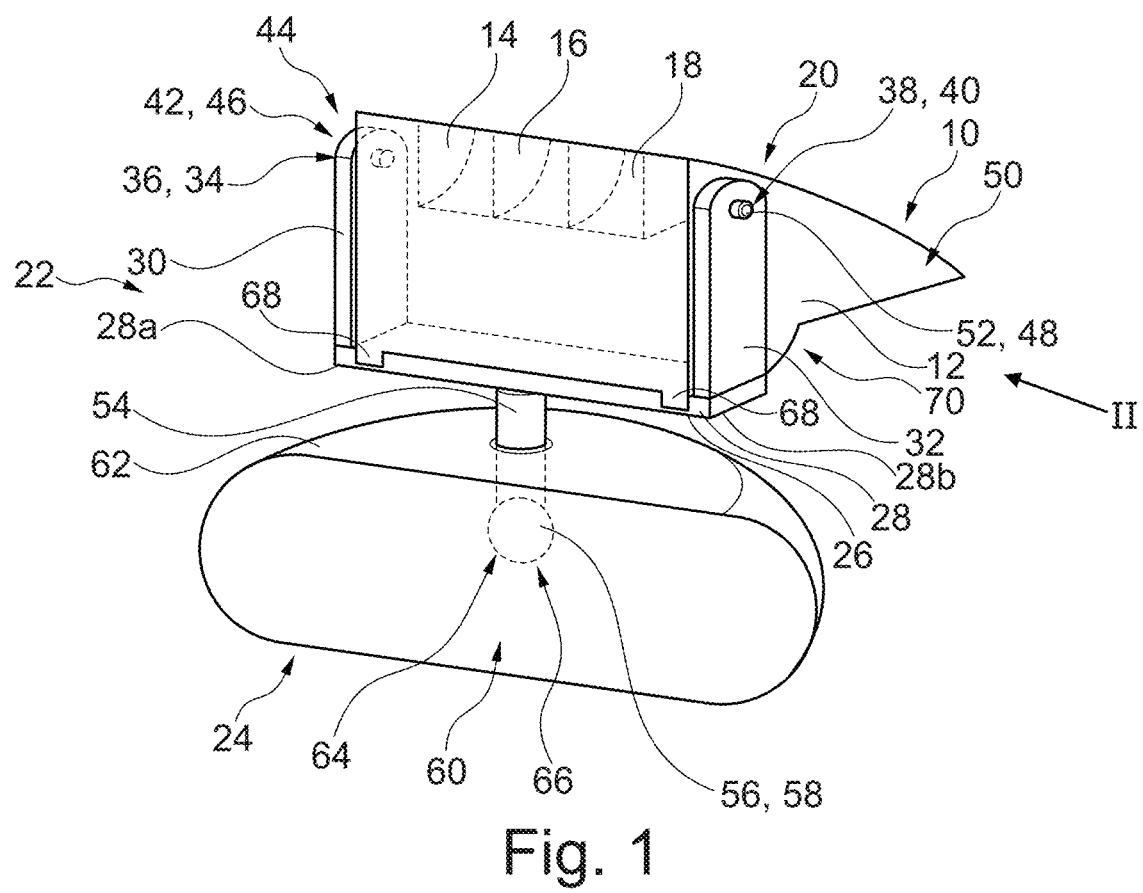
FIG. 1 shows an interior module according to the present disclosure, including an interior mirror module according to the present disclosure and a mounting bracket according to the present disclosure.

FIG. 1 shows an interior module 10 for a vehicle. The interior module 10 includes a console unit 12 which, in the present example, houses a radar unit 14, a camera unit 16, and a rain sensor unit 18. In FIG. 1, the radar unit 14, the camera unit 16, and the rain sensor unit 18 are represented schematically only. It is noted that alternatively or additionally, the console unit 12 may also house a lidar unit.

In the present example, the console unit 12 is configured for being mounted to a top portion of an interior side of a windshield of the vehicle. To this end, the console unit 12 has a connection interface 20 which is configured for connecting the console unit to the windshield. The connection interface 20 may be a gluing surface to be glued to the interior side of the windshield.

The interior module 10 also includes an interior mirror module 22 which is pivotably supported on the console unit 12. The interior mirror module includes an interior mirror assembly 24 and a mounting bracket 26. The mounting bracket 26 has a bar-shaped support element 28 having a first end 28a and a second end 28b. Moreover, the mounting bracket 26 includes a first lever arm 30 which extends from the first end 28a. Additionally, the mounting bracket has a second lever arm 32 which extends from the second end 28b.

The first lever arm 30 and the second lever arm 32 are generally shaped identically and extend in parallel from the support element 28. The support element 28, the first lever arm 30 and the second lever arm 32 form a U-shape. Furthermore, on its free end, the first lever arm 30 has a first pivot feature 34 which in the present example includes a hole 36.

The second lever arm 32 has a second pivot feature 38 on its free end which also includes a hole 40.

The first pivot feature 34 and the second pivot feature 38 of the mounting bracket 26 interact with corresponding pivot features of the console unit 12.

A first pivot feature 42 of the console unit 12 is arranged on a first side surface 44 of the console unit 12. The first pivot feature 42 includes a stub axle 46 which is received in the hole 36 of the first pivot feature 34 of the mounting bracket 26.

A second pivot feature 48 of the console unit 12 is arranged on a second side surface 50 of the console unit 12. The second side surface 50 is arranged opposite the first side surface 44. The second pivot feature 48 also includes a stub axle 52 which is received in the hole 40 of the second pivot feature 38 of the mounting bracket 26.

Thus, the mounting bracket 26 is pivotably supported on the console unit 12.

At the same time, a portion of the console unit 12 is received in an interior of the U-shape formed by the support element 28, the first lever arm 30 and the second lever arm 32.

The mounting bracket additionally includes an extension element 54 which is connected to the support element 28. The extension element 54 is arranged substantially in the middle between the first end 28a and the second end 28b of the support element 28. The extension element 54 extends from the support element in a direction substantially opposite to the direction into which the first lever arm 30 and the second lever arm 32 extend. At a free end of the extension element 54 a mounting interface 56 is provided.

The mounting interface 56 is configured for connecting the interior mirror assembly 24 to the mounting bracket 26. The mounting interface 56 includes a joint ball 58.

In the present example, the support element 28, the first lever arm 30, the second lever arm 32, the extension element 54 and the mounting interface 56 are formed as portions of a unitary piece.

The interior mirror assembly 24 includes a mirror element 60, i.e. a plate-shaped element being reflective on one side, and a mirror housing 62 in which the mirror element 60 is arranged.

On the mirror housing 62 a recess 64 is formed. The joint ball 58 engages the recess 64 such that the mirror housing 62 is connected to the mounting bracket 26 via a ball joint 66.

Figure 2:
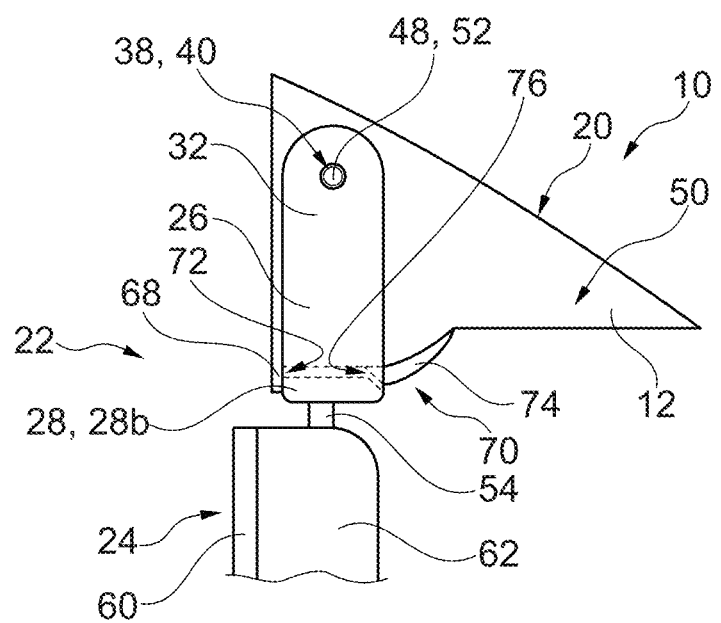
FIG. 2 shows a detail of the interior module of FIG. 1 in a lateral view along direction II in FIG. 1.
Figure 3:
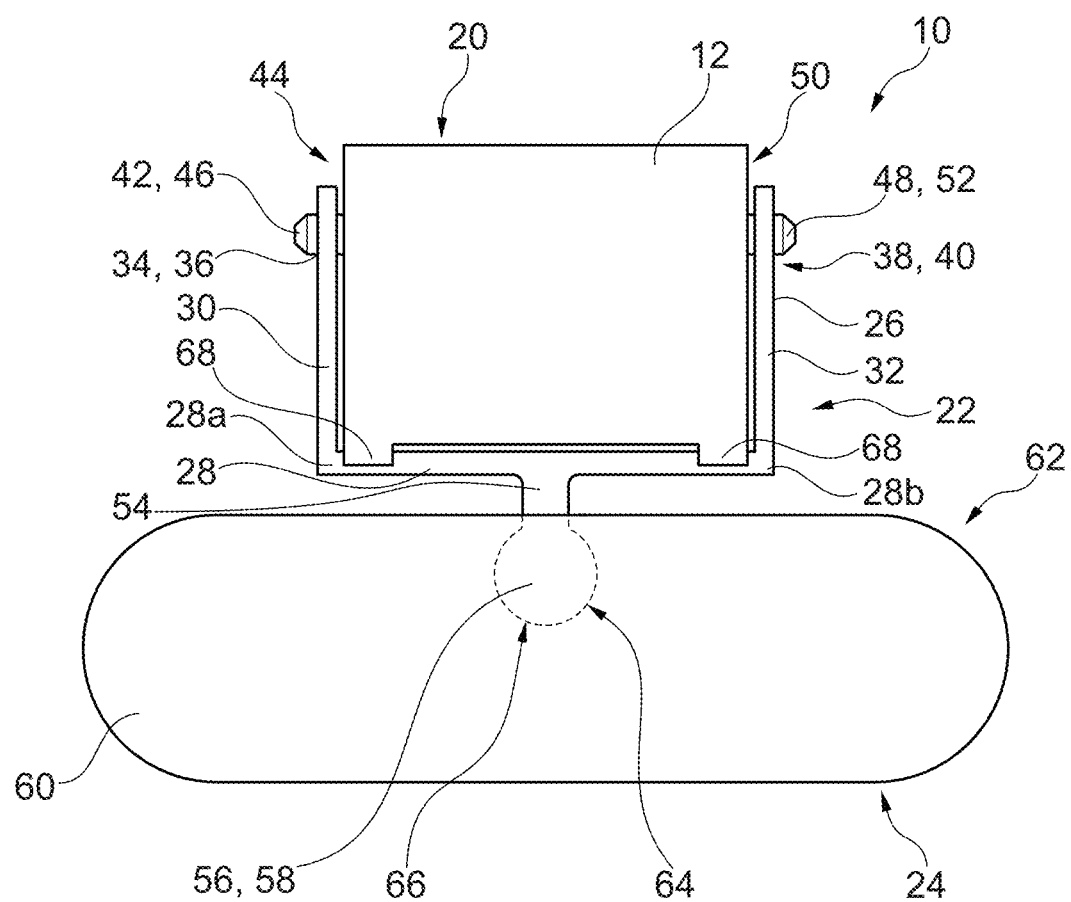
FIG. 3 shows the interior module of FIG. 1 in a frontal view.

In FIGS. 2 and 3 further details of the interaction between the mounting bracket 26 and the console unit 12 are shown.

As in FIG. 1, also in FIGS. 2 and 3, the mounting bracket 26 is shown in an operational position, i.e. in a position in which the interior mirror assembly 24 being mounted to the mounting bracket 26 can be used by a driver of the vehicle to observe rear traffic.

In order to keep the mounting bracket 26 in this operational positon, two abutment elements 68 are provided on the console unit 12. In the present example, the abutment elements 68 are formed as protrusions being integral with the console unit 12. They are arranged on a bottom surface 70 of the console unit 12. Moreover, the abutment elements 68 are located adjacent to the first side surface 44 and the second side surface 50 respectively. Each of the abutment elements 68 includes an abutment surface 72 against which the mounting bracket 26, more precisely a side surface of the support element 28 abuts when the mounting bracket 26 is in the operational position (cf. FIG. 2).

Furthermore, on the console unit 12, two holding protrusions 74 are provided. Also the holding protrusions 74 are arranged on the bottom surface 70 of the console unit 12 and are formed integrally. Moreover, the holding protrusions 74 are arranged adjacent to the first side surface 44 and the second side surface 50 respectively. In the operational positon of the mounting bracket 26, the holding protrusions 74 are arranged on an opposite side of the support element 28 as compared to the abutment elements 68. In other words, a space between neighboring abutment elements 68 and holding protrusions 74 substantially corresponds to a width of the support element 28. Consequently, corresponding holding portions of the mounting bracket 26, more precisely of the support element 28, may be received between each abutment element 68 and its neighboring holding protrusion 74.

In the present example, the mounting bracket 26 disposes of a certain elasticity. Thus, the mounting bracket 26 is elastically deformable in the following ways.

The free ends of the first lever arm 30 and the second lever arm 32 are elastically deformable in a direction parallel to the extension of the support element 28. In other words, the free ends of the first lever arm 30 and the second lever arm 32 may be elastically deformed such that a distance between the free ends is increased.

This kind of deformability is used for mounting the mounting bracket 26 on the console unit 12. The deformability allows to place the stub axles 46, 52 of the console unit 12 in the respective holes 36, 40.

Moreover, the support element 28 of the mounting bracket 26 is elastically deformable such that the mounting bracket 26 may be transferred into a retracted position. In this retracted position, the abutment elements 68 and the holding portions of the support part 28 are arranged on opposite sides of the holding protrusions 74. This means that the support element 28 is elastically deformable in a way that it can slide over the holding protrusions 74 when the mounting bracket 26 pivots about the console unit 12 using pivot features 34, 38, 42, 48.

Of course, a certain force needs to be applied to the interior mirror assembly 24 or the mounting bracket 26 in order to move the mounting bracket 26 together with the interior mirror assembly 24 into the retracted position. In order to allow for a smooth transition to the retracted position, the side surfaces 76 of the holding protrusions 74 facing the neighboring abutment elements 68 respectively, are curved.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage.

The invention claimed is:

1. An interior module for a vehicle, the interior module comprising:
   a console unit having a connection interface being configured for connecting the console unit to a windshield or to a roof structure of the vehicle; and
   a mounting bracket comprising:
      a support element having a first end and a second end;
      a mounting interface for connecting an interior mirror assembly to the mounting bracket, the mounting interface being connected to the support element at a position between the first end and the second end;
      a first lever arm extending from the first end of the support element and the first lever arm having a first pivot feature at its free end; and
      a second lever arm extending from the second end of the support element and the second lever arm having a second pivot feature at its free end;
      wherein the support element, the first lever arm and the second lever arm form a U-shape;
   wherein the mounting bracket is pivotably supported on the console unit via the pivot features of the first lever arm and the second lever arm and corresponding pivot features of the console unit,
   wherein at least one abutment element is provided on the console unit, the abutment element comprising an abutment surface against which the mounting bracket abuts when being in an operational position,
   wherein at least one holding protrusion is provided on the console unit, the at least one holding protrusion being arranged at a distance from the abutment element such that a holding portion of the mounting bracket may be received between the abutment element and the holding protrusion when the mounting bracket is in the operational position, wherein the holding portion of the mounting bracket is a portion of the support element, and
   wherein at least one of the holding protrusion and a portion of the mounting bracket is deformable such that the mounting bracket may be transferred into a retracted position, in which the holding portion of the mounting bracket is spaced away from the abutment element and onto the holding protrusion.

2. The interior module of claim 1, wherein each of the pivot features of the console unit comprises at least one of a pivot hole and a stub axle.

3. The interior module of claim 1, wherein at least a portion of the console unit is received in an interior of the U-shape formed by the support element, the first lever arm and the second lever arm of the mounting bracket.

4. The interior module of claim 1, wherein inside the console unit at least one of a radar unit, a lidar unit, a camera unit, a light sensor unit, a humidity sensor unit, and a rain sensor unit is arranged.

5. The interior module of claim 1, further comprising the interior mirror assembly, wherein the interior mirror assembly is connected to the mounting bracket via the mounting interface.

6. The interior module of claim 1, wherein the first lever arm and the second lever arm extend in parallel from the support element.

7. The interior module of claim 1, wherein the mounting interface is connected to the support element via an extension element.

8. The interior module of claim 1, wherein the mounting interface comprises a joint ball.

9. The interior module of claim 1, wherein the support element, the first lever arm, the second lever arm and the mounting interface are portions of a unitary piece.

10. The interior module of claim 1, wherein the free end of at least one of the first lever arm and the second lever arm is elastically deformable in a direction parallel to an extension of the support element.

* * * * *